Patented Dec. 28, 1948

2,457,238

UNITED STATES PATENT OFFICE 2,457,238

FRACTIONATION OF POLYMERIC ETHYLENE

Edward Hunter and Raymond B. Richards, Northwich, England, assignors to Imperial Chemical Industries Limited, a corporation of Great Britain No Drawing. Application October 25, 1944, Serial No. 560,352. In Great Britain November 29, 1943

2 Claims. (Cl. 260—94)

This invention relates to a new and improved process for fractionating mixtures of solid polymers, and for comminuting those solid polymers which are normally difficult to obtain in the form of fine granules or powders.

It is known that certain liquids and a few solids dissolve in certain compressed gases, and that with some gases it is not necessary to use very great pressures to show that the solubility in a gas may be as great as in a liquid solvent. For example, camphor and paraffin can be dissolved in very noticeable quantities even in only 1 cc. of compressed methane, i. e., less than a decigram. On removing the pressure these bodies are deposited; the camphor crystallises on the walls, and paraffin as brilliant flakes. Above 150 atmospheres, ethylene dissolves paraffin abundantly, and on removing the pressure the latter becomes solid again. So far, however, all the results which were known to be obtainable by distillation in gases at these pressures could more readily be obtained by conventional methods, and there has been no purpose in trying to overcome the practical difficulties involved in any industrial application of this laboratory phenomenon.

Many solid polymers of high molecular weight have recently become available, generally in the form of mixtures of solids of a wide range of molecular weights. When molten, they are themselves known to dissolve gases under high pressures. These polymers are difficult to fractionate into solids of a narrower range of molecular weights by conventional fractional crystallisation or dissolution, and they are generally difficult to prepare in powdered or granular forms. We have now found that solid polymers obtained from compounds having monoolefinic unsaturation can be dissolved in high pressure organic gases, and that fractions of progressively lower molecular weight can then be deposited as granular or powdered solids.

According to the present invention we provide a process which comprises dissolving solid polymers of compounds which have monoolefinic unsaturation, in an organic gas at a high pressure preferably exceeding 500 atmospheres, and a raised temperature preferably between 50° and 350° C., by providing intimate contact between them, and thereafter at least partially reducing the pressure and/or temperature of the gaseous phase.

The solid polymers of compounds which have monoolefinic unsaturation to which this invention is applicable are the essentially straight or branched chain polymers of mean molecular weight exceeding 5,000, generally 10,000–40,000 and even higher, and virtually free from crosslinkages. They contain homologues of much lower molecular weight and also of higher molecular weight than the mean; the lower molecular weight fractions have been found to lead to undesirable properties such as low softening point and low tensile strength. The aim in polymerisation is frequently to obtain products of high mean molecular weight with only a narrow range of molecular weights. These polymers may be obtained from one or more compounds having monoolefinic unsaturation, i. e. compounds having one carbon-carbon double bond, alone or together with compounds with which they can interpolymerise, by the methods known for polymerising such compounds. The principal polymers to which the invention is applicable are polythene, polyisobutene, polyvinyl chloride, polystyrene and polymethyl acrylate. All the polymers to which the invention is applicable are soluble in some organic liquid solvent, such as aliphatic or aromatic hydrocarbon liquids, ethers, alcohols, carbon tetrachloride and chloroform, generally at a raised temperature such as 60°–120° C.

Dissolution in a compressed gas is effected at a raised temperature preferably between 50° and 350° C., by bringing the polymer into intimate contact with the gas while the gas is in motion, e. g. stirred or circulating. The solubility of polymers in compressed gases is due to a small extent to the raising of the partial pressure of polymers of high molecular weight by the high total pressure; and also in the case of solvent gases to the much greater solvent effect of these substances at high densities and high pressures. Thus we prefer to employ solvent gases, by which we mean one of the following classes: (a) gases which in the liquid state have a solvent action on the polymer, (b) gases which belong to the same homologous series as liquids which have a solvent action on the polymer, (c) gases whose simple substituted liquid derivatives have a solvent action on the polymer. For example, for polythene which is soluble in most liquid hydrocarbons at 70°–120° C., and polyisobutane and polystyrene which are soluble in some liquid hydrocarbons at 20° C. and above, we prefer to use a paraffin or olefine of 1–4 carbon atoms. For polymethylmethacrylate which is soluble in liquid chloroform or acetone we prefer to use methyl chloride or gaseous acetone. For halogen-containing polymers such as polyvinyl chloride which are soluble in ethylene dichloride at 80° C. we generally use halogen-containing solvents such as methyl chloride, methyl fluoride, and fluorine-containing olefines containing an inhibitor to prevent polymerisation. We may also use gaseous mixtures such as ethylene containing a small proportion up to 20% of benzene or hexane. As the operating pressure is high, generally 500 atmospheres or more, the preferred gases are organic materials which cannot be condensed to liquids at any pressure at the operating temperature.

The actual pressure and temperature required depend on the solvent and on the polymer. The preferred solvents are effective for polymers having a mean molecular weight of 5,000–10,000 at a pressure of about 500–1000 atmospheres and a temperature exceeding 40° C., generally exceeding 100° C. The effectiveness increases with rise of pressure and temperature, and polymers of mean molecular weight 40,000–100,000 can generally only be dissolved at pressures above 2000 atmospheres and at the highest temperatures to which the polymers can be subjected without appreciable degradation, e. g. 200°–350° C. For example, polythene of mean molecular weight 14,000 can be dissolved in ethane, methane, ethylene or propylene, to the extent of 10–30 parts by weight per 100 parts of solvent at 1500 atmospheres and 200° C.; or about 5 parts per 100 parts of solvent at 1200 atmospheres and 180° C. In the case of ethylene some polymerisation occurs under these conditions but this does not interfere with the dissolution and precipitation of the initial polythene. Polyisobutane of mean molecular weight 60,000, on the other hand, is only soluble to the extent of 0.2–1 parts per 100 parts of solvent at 2000–3000 atmospheres depending on the solvent and the temperature. With polymers of mean molecular weight above 40,000, it is preferable only to effect partial dissolution so as to extract the lower molecular weight polymer and leave a residue comparatively free from the lower molecular weight fraction, the latter fraction being recovered from the gaseous phase by lowering the temperature and/or pressure thereof. The major effects on the solubility at high temperatures are the pressure and molecular weight; higher pressures are required for dissolving the higher molecular weight polymers.

For fractionation, the pressure and/or temperature of the gaseous phase containing dissolved polymer is partially lowered and this results in precipitation of the higher molecular weight fractions of the mixture of homologues comprising the polymer, either as a liquid or a solid. After separation of this fraction, further fractionation can be effected by further lowering the pressure and/or temperature until all the polymer is recovered. The remaining gas can be recompressed for a further dissolving operation. For the production of the polymer as a fine powder, precipitation is carried out at a temperature below the softening point of the polymer at the pressure at which precipitation is carried out, by expanding the gaseous solution to a pressure below 500 atmospheres and a temperature below 100° C., preferably to atmospheric pressure and temperature.

The polymers may be partially or completely dissolved in the gaseous phase depending on the conditions. It is frequently advantageous merely to dissolve the lower molecular weight fraction and leave a residue virtually free from such lower molecular weight material.

The invention is illustrated but not restricted by the following examples.

Example 1

A stainless steel stirred pressure vessel is one-eighth filled with 100 parts by weight of melted polythene of mean molecular weight 14,000. Ethane is compressed into the vessel at a temperature of 180° C. to a pressure of 1500 atmospheres. After stirring for 2 hours the gas phase is passed through a release valve to a second pressure vessel where the temperature and pressure are maintained at 105° C. and 1200 atmospheres, and thence to a third vessel maintained at atmospheric pressure. In the second vessel there is collected 75 parts by weight of polythene of mean molecular weight 16,000, and in the third vessel is collected 25 parts by weight of powdered polythene of mean molecular weight 8000.

Example 2

A stirred vessel A contains a mixture of 8.7 parts by weight of polythene of mean molecular weight 17,100 and 100 parts of ethylene at 130 atmospheres and 220° C. The stirrer is stopped and a valve at the top of the vessel is opened, so that 64 parts of a gaseous solution of polythene in ethylene pass through a narrow bore pipe into a second vessel, in which the pressure drops to 75 atmospheres and the temperature to 25° C. The valve is then closed and the second vessel is opened to atmosphere. It is found to contain 1.5 parts of polythene of molecular weight 13,000 in the form of a felted material composed of fibres of length up to 5 mm. Vessel A is found, after cooling and opening to atmosphere, to contain 7.2 parts of polythene of molecular weight 18,000 in the form of a fused mass.

Example 3

A stirred vertical cylindrical vessel contains a mixture of 12 parts of polythene of mean molecular weight 21,500 and 100 parts of ethylene at 1400 atmospheres and 190° C. The vessel is then cooled by a blast of cold compressed air to 30° C., the pressure falling to 450 atmospheres. The vessel is then blown down to atmospheric pressure and opened. The upper part of the vessel is found to contain 1.2 parts of powdered polythene composed of loose aggregates of approximately spherical particles of average diameter below 0.01 mm., of molecular weight 9000; while the bottom of the vessel contains a fused mass of 10.8 parts of polythene of molecular weight 23,000.

Example 4

A reaction vessel containing 2.5 parts of polystyrene of mean molecular weight 6100 is filled with 100 parts of ethylene at 1000 atmospheres, and maintained at 100° C. for 18 hours. The pressure is then released. The ethylene is found to have extracted low molecular weight material from the polystyrene, as shown by a loss in weight of 0.06 part and an increase in average molecular weight to 6400.

Example 5

A reaction vessel containing 2.5 parts of polyisobutene of mean molecular weight 17,000 is filled with 100 parts of ethylene at 1000 atmospheres and maintained at 80° for 18 hours. The pressure is then released. The polyisobutene is found to have lost 0.15 part in weight, and has a molecular weight of 17,850.

What we claim is:

1. A process which comprises dissolving a solid polymer of ethylene having a molecular weight between 10,000 and 40,000 in ethylene gas at a pressure in excess of 500 atmospheres and a temperature between 50 and 350° C., cooling the resulting mixture and thereafter blowing down to atmospheric pressure whereby polymers of ethylene are obtained in two solid phases.

2. A process which comprises dissolving a solid polymer of ethylene having a molecular weight of 21,500 in ethylene gas at a temperature of 190° C. and a pressure of 1400 atmospheres, cooling the mixture by cold air to 30° C., thereafter releasing the pressure to atmospheric pressure and thereby recovering ethylene polymers in two solid phases, one phase having a molecular weight of about 9,000 and composed of loose approximately spherical particles, the other a molecular weight of about 23,000 as a fused mass.

EDWARD HUNTER.
RAYMOND B. RICHARDS.

REFERENCES CITED

The following references are of record in the file of this patent:

UNITED STATES PATENTS

| Number | Name | Date |
|---|---|---|
| 2,153,553 | Fawcett | Apr. 11, 1937 |
| 2,388,160 | Krase | Oct. 30, 1945 |